Feb. 14, 1961 J. M. KENDALL 2,972,026

DAMPED INERTIA SWITCH

Filed May 7, 1948 5 Sheets-Sheet 1

Inventor
J. M. Kendall

By M. A. Hayes
Attorney

Feb. 14, 1961 J. M. KENDALL 2,972,026

DAMPED INERTIA SWITCH

Filed May 7, 1948 5 Sheets-Sheet 2

Inventor

J. M. Kendall

By M. O. Hayes

Attorney

Feb. 14, 1961 J. M. KENDALL 2,972,026

DAMPED INERTIA SWITCH

Filed May 7, 1948 5 Sheets-Sheet 3

Inventor

J. M. Kendall

By M. C. Hayes

Attorney

Feb. 14, 1961 | J. M. KENDALL | 2,972,026

DAMPED INERTIA SWITCH

Filed May 7, 1948 | 5 Sheets-Sheet 4

Inventor
J. M. Kendall

By M. D. Hayes

Attorney

Inventor
J. M. Kendall
By M. O. Hayes
Attorney

United States Patent Office 2,972,026
Patented Feb. 14, 1961

2,972,026
DAMPED INERTIA SWITCH

James M. Kendall, Coral Hills, Md. (Naval Ordnance Laboratory, White Oak, Silver Spring 19, Md.)

Filed May 7, 1948, Ser. No. 25,771
12 Claims. (Cl. 200—61.5)
(Granted under Title 35, U.S. Code (1952), sec. 266)

This invention relates generally to inertia responsive devices and more particularly to inertia switch mechanisms of a type suitable for use in closing the firing circuit of a torpedo exploder mechanism in response to the impact of the torpedo with a target vessel.

More specifically, the present invention contemplates the provision of an inertia switch of the foregoing character which is extremely sensitive to the impact of the torpedo with the target vessel while being ineffective to close the firing circuit in response to pulsations, vibrations, and normal irregularities of motion of a running torpedo, or in response to countermine shocks received through the surrounding water.

It is desirable to have the inertia switch of a torpedo exploder mechanism resistant to countermine shocks, particularly when a salvo of torpedoes is shot at an enemy vessel. In such case, were the inertia switches of the several torpedoes in the salvo not countermine resistant, the first torpedo of the salvo to explode would produce simultaneous explosions of the remaining torpedoes in the salvo, and hence they would be ineffective to cause further damage to the enemy ship. It is also desirable that the inertia switch be resistant to pulsations, vibrations, and normal irregularities of motion of the running torpedo in order to avoid premature operation of the exploder mechanism resulting in the explosion of the torpedo. In such case the target vessel would thus instantly be made aware that it is under attack and would then either follow evasive tactics or take retaliatory action against the launching submarine.

A torpedo exploder mechanism generally comprises means for moving various parts of the mechanism from a safe or unarmed position to an armed position as the torpedo moves away from the launching craft. This is usually accomplished by cocking a firing pin in a mechanical exploder mechanism or moving detonating elements into proper firing relation in an electrically operated exploder mechanism as the torpedo moves through the water. The firing circuit of an electrical torpedo exploder mechanism generally includes a source of electrical energy, an electroresponsive detonator, and an inertia responsive switch adapted to connect the detonator to the electrical source in response to the impact of the torpedo with a target vessel. An electrical exploder mechanism having a firing circuit adapted to accomplish the foregoing firing operation is disclosed and claimed in the copending application of James M. Kendall et al., Serial No. 780,562, filed October 17, 1947, now Patent No. 2,954,734, issued October 4, 1960, for Torpedo Exploder Mechanism.

The inertia responsive switch employed in certain of the exploder mechanisms heretofore devised comprises an inertia responsive electroconducting mass which is yieldably held by a spring against a solid member and out of engagement with a coacting electroconducting casing, the solid member being disposed within the torpedo in the aft direction. When the switch is subjected to inertia forces such, for example, as the impact of the torpedo with a target vessel, the mass is adapted to move forward or laterally into engagement with the casing and thereby complete an electrical circuit between the terminals of the switch to fire the detonator. By reason of this arrangement, in the event a countermine shock is received by the torpedo, particularly in the case of a countermine shock received from the aft direction, the inertia mass is suddenly given a high velocity in the forward direction as a result of momentum transfer between the torpedo and the mass, which momentum transfer causes the mass to move or coast forward into contact with the casing. This result is caused by the motion, jump, or particle displacement of the torpedo in response to the countermine shock and occurs even though the motion of the torpedo in response to the shock is less than that which would cause actuation of the inertia switch if the shock were received in the forward direction.

In the switch arrangement of the present invention, momentum transfer is avoided by the provision of a spring suspension for the mass which renders the mass flexible and movable in all directions including the aft direction without making contact with a solid member. Moreover, the inertia switch of the present invention is constructed and arranged such that the distance through which the inertia responsive mass must move in order to make contact with the casing is greater than the motion, jump, or particle displacement of the torpedo within the water in response to a countermine shock resulting, for example, from the explosion of a charge in the order of 1000 pounds of TNT exploded at a distance of 300 feet from the torpedo in any direction therefrom, the motion of the torpedo in such case being in the order of hundredths of an inch. This arrangement renders the inertia switch substantially unresponsive to such countermine shocks as may be received in actual use of the switch in service.

After impact of the torpedo with a target vessel, in the case of a torpedo which does not detonate instantly upon impact, the torpedo continues to move a distance in the order of inches as the war head becomes crushed, in contradistinction to the hundredths of an inch movement of the torpedo in response to a countermine shock. It is this difference in the motions of the torpedo due respectively to the shocks of impact and countermine which enables a torpedo exploder mechanism employing the inertia switch of the present invention to discriminate between countermine shocks and impacts.

In the switch arrangement of the present invention, as stated hereinbefore, the inertia mass is suspended within a casing on the end of a coil spring which renders the mass flexible and movable in all directions. Such an arrangement, in the absence of the damping means hereinafter to be described, forms an undamped resonant system in which vibrations of the torpedo at the resonant frequency of the system or the occurrence of a few small synchronous impulses such, for example, as occur as a result of uneven running of the torpedo build up a resonant oscillation of the inertia mass to a point where the mass moves into engagement with the casing, thereby to close the switch contacts and fire the torpedo prematurely. The resonant oscillations of the mass are avoided in the inertia switch arrangement of the present invention, however, by providing a damping means which absorbs energy from the oscillating mass so that the oscillations die out rapidly, the system being critically damped when the oscillations die out in a fraction of the time required for one period of oscillation.

The inertia switch of the present invention is critically damped according to the preferred embodiment thereof wherein the switch housing is constructed oil-tight and filled with a damping fluid which surrounds the inertia mass. Thus, upon movement of the mass, the oil surrounding the mass is deformed, and by reason of its viscosity, energy from the inertia mass is absorbed thereby with a resultant damping of the mass and elimination of resonant oscillations.

Oil damping of the inertia mass and the buoyancy of the mass within the oil tend to retard the movement of the mass therein, thereby reducing the sensitivity of the inertia switch. Reduction of the sensitivity may be overcome, however, and a desired sensitivity may be obtained in any case, by employing a system of mounting springs for the inertia mass which provides sufficient resiliency to effect the desired sensitivity.

According to an alternative embodiment of the inertia switch of the present invention, the inertia mass thereof is critically damped by arranging the inertia mass in the form of a hollow member having a metal ball disposed for free movement therewithin. When the hollow member tends to develop resonant oscillations by reason of its spring mounting, the ball freely moves about within the member and dissipates a certain amount of the energy thereof with each contact of the ball with the member. The result of this energy dissipation is to suppress the tendency of the hollow member to oscillate at resonance.

An object of the present invention is to provide an inertia switch for a torpedo exploder which is effective to close the firing circuit of the exploder mechanism in response to the impact of the torpedo with a target vessel while being ineffective to close the firing circuit in response to pulsations, vibrations, and normal irregularities of motion of a running torpedo.

Another object of the present invention is to provide an inertia switch of this character for closing the firing circuit of a torpedo exploder mechanism upon impact of the torpedo with its target while preventing the premature closing of the firing circuit in response to countermine shocks communicated through the surrounding water.

Another object of the present invention is to provide a new and improved inertia switch for a torpedo exploder mechanism wherein the inertia responsive element is flexibly suspended and damped to eliminate the resonant vibrations of the element otherwise resulting from the vibrations of the running torpedo.

Still another object of the invention is to provide an inertia switch for a torpedo exploder mechanism in which the inertia mass is spring supported in a manner which avoids momentum transfer between the torpedo and the inertia mass of the inertia switch forces when the torpedo is subjected to countermine shocks.

A further object of the present invention is to provide an inertia switch for a torpedo exploder mechanism in which the switch is constructed and arranged such that the distance through which the inertia responsive mass must move in order to make contact with the casing and thereby close the switch contacts is greater than the motion, jump or particle displacement of the torpedo within the water in response to a countermine shock.

An additional object is to provide a damped inertia switch having a spring mounted inertia mass, wherein provision is made for absorbing energy from the moving mass thereby to suppress the tendency of the mass to oscillate at the resonant frequency thereof.

A still further object is to provide a new and improved inertia responsive switch of this character which will be economical to manufacture, reliable in operation, and which possesses all the qualities of ruggedness and durability in service.

Still other objects, features, advantages and improvements of the inertia switch of the present invention will become apparent from the following description taken in connection with the accompanying drawings of which:

Figures 1, 2, 3:
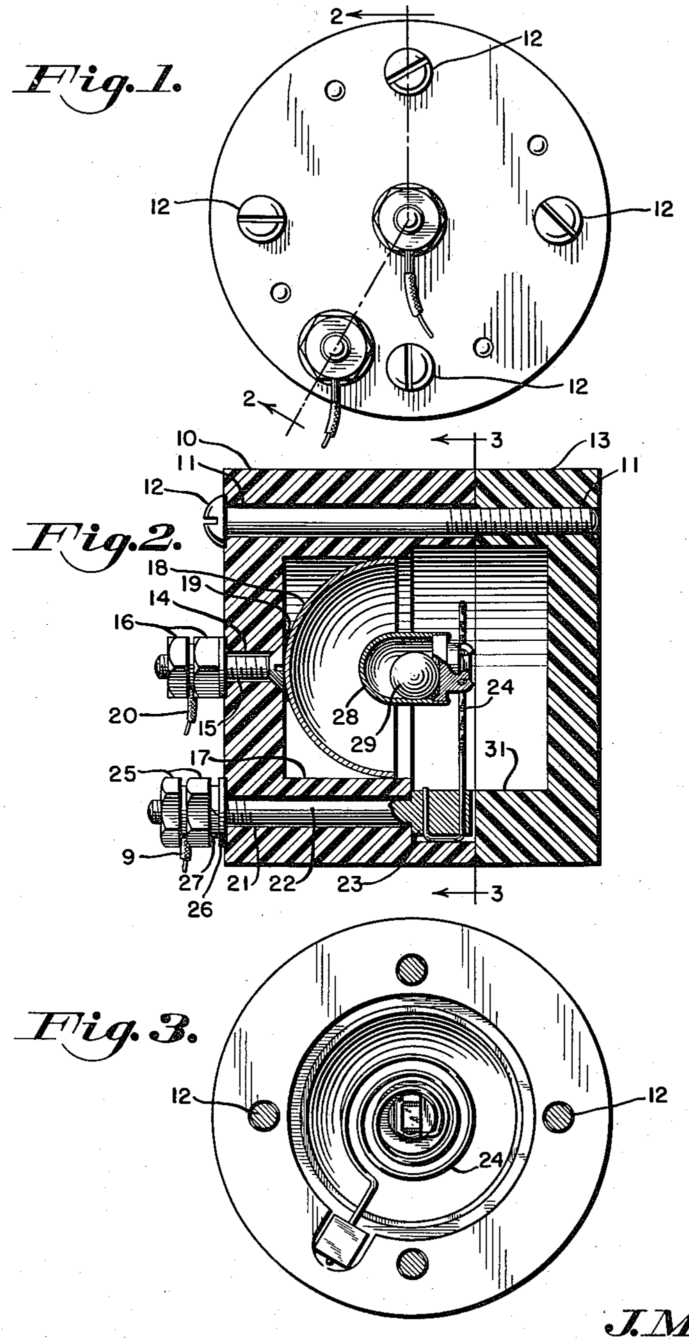
Fig. 1 is an end view of an inertia responsive switch according to one embodiment of the present invention.
Fig. 2 is a sectional view taken along line 2—2 of Fig. 1.
Fig. 3 is a sectional view taken along line 3—3 of Fig. 2.
Figure 7:
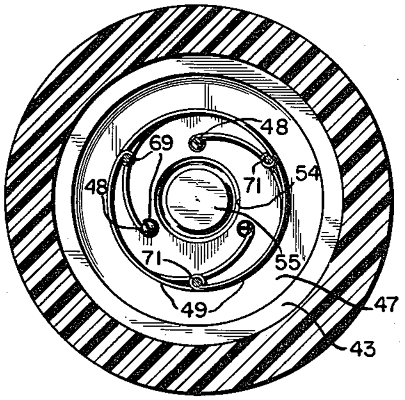
Fig. 7 is a sectional view taken along line 7—7 of Fig. 6.

Referring now to the drawings on which like numerals of reference are employed to designate like parts throughout the several views, and more particularly to Figs. 1 and 2, there is shown thereon an inertia responsive switch employing a lead ball confined in a hollow cup to damp the vibrations of the inertia responsive element. The switch comprises a base 10 having a plurality of bores 11 therethrough adapted to receive machine screws 12 in threaded engagement with cap 13 and employed to secure base 10 to the cap 13. The cap 13 preferably is formed of phenolic material and is provided with an axially disposed recess 31 therein. Base 10 is also formed of phenolic material and is provided with an axial bore 14 therethrough for receiving screw 15 therein which is held to the base 10 by nuts 16 with electrical conductor 20 secured therebetween. Base 10 has an axially disposed recess 17 into which is fitted a concave or hemispherical contact 18, formed of electroconducting material, which is held therein by soldering the head of the screw 15 to the contact 18, as at 19.

Base 10 is provided with a longitudinal bore 21 therethrough for receiving bolt 22 therein. Bolt 22 is provided with an enlarged rectangular portion 23 to which one end of spiral spring 24 is anchored in any convenient manner, preferably as shown. Bolt 22 is secured within bore 21 in a well known manner as by nuts 25, lockwasher 27, and flat washer 26, electrical conductor 9 being secured between nuts 25. The free end of spring 24 has secured thereto, in any suitable manner, a hollow cup 28 which forms a part of the aforementioned inertia responsive element, the spring being pinched to the cup in the manner shown and being formed of any suitable electroconducting material. The inertia member also comprises a ball 29 which is loosely confined within cup 28 and preferably formed of any material suitable for the purpose such, for example, as lead.

Cup 28 is disposed within and yieldably maintained out of engagement with the contact 18 by the spring 24. In practice, the inertia switch is so mounted with respect to associated apparatus as to cause the switch to be actuated when shocks or impulses to which the apparatus is subjected are received by the apparatus from predetermined directions such, for example, as in the case wherein the switch is employed in a torpedo exploder mechanism to complete the firing circuit of the mechanism when a shock is received by the torpedo from a direction forwardly or laterally thereof, the switch in this case being mounted within the torpedo with the inertia element disposed rearwardly of the hemispherical contact and preferably with the cylindrical axis of the switch coincidental or parallel with the longitudinal axis of the torpedo. As an example, the inertia switch may be employed in the firing circuit of the torpedo exploder mechanism disclosed in the aforementioned application Serial No. 780,562, in place of the inertia actuated switch 74 thereof. Thus, when the torpedo strikes a target vessel with a resulting set forward or lateral force on the inertia member, the cup 28 moves forwardly into engagement with contact 18, thereby to complete the aforementioned firing circuit between conductors 9 and 20 to fire the torpedo. Should the torpedo receive a countermine shock from the rear of the torpedo, the cup 28 in response to the set back force thereon moves rearwardly into recess 31 of cap 13 without making contact therewith and thus avoids momentum transfer upon impact which might be sufficient to cause the cup to coast forward into contact with contact member 18.

By arranging the cup 28 so that it is flexibly suspended and may move in any direction relative to the contact 18, an inertia switch has been provided which will not operate to close the switch contacts in response to countermine shocks yet will move to close the switch contacts to fire the torpedo in response to the impact of the torpedo with a target vessel.

A study of countermine shocks indicates that a water particle experiences an almost instantaneous jump from its initial position to a new position. The magnitude of the jump depends on the size of the charge of explosive and on the distance of the particle of water from the explosive charge. The larger the explosive charge and the closer the water particle under consideration is to the charge, the greater the jump. The sizes of explosive charges and the distances of the charges usually encountered in the use of torpedo exploders, the magnitude of the jump usually amounts to a fraction of an inch.

Figure 13:
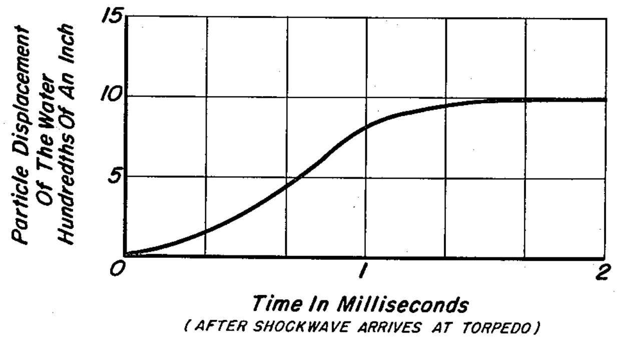
Fig. 13 is a chart illustrating the particle displacement of water as a function of time in response to a countermine shock resulting from an underwater explosion.

A typical example of the jump obtained for 1000 pounds of TNT at a distance of 300 feet is given in Fig. 13, which represents the change in position of a particle of water during the jump. It will be seen that the time is measured in thousandths of a second (milliseconds) and that the particle displacement is shown in hundredths of an inch. It is further seen that the jump is about one-tenth of an inch and occurs within a length of time approximately equal to two-thousandths of a second, after which substantially no further motion occurs.

Since the weight of a torpedo is very nearly the same as the water which it displaces, the torpedo, as a rough approximation, may be considered to be a particle of water. In such case, it may be assumed that the torpedo is displaced substantially in the same manner as a particle of water in response to a countermine shock. The motion of the water, and hence the motion of the torpedo, is then given approximately by the above curve. Thus, the motion of the torpedo in response to a countermine shock resulting from the explosion of such a charge as causes the particle displacement shown in Fig. 13 is on the average, about one-tenth of an inch displacement for two milliseconds.

Most inertia switches heretofore devised for use in torpedoes have the inertia mass resting against a solid member located in the aft direction of the torpedo so that the inertia weight could move either in the forward direction or laterally of the movement of the torpedo, but could not move in the aft direction.

Thus, in the case of certain prior art switches, when a countermine shock is received from the aft direction, "momentum transfer" takes place, i.e., the shock received by the solid member is transferred to the inertia mass to cause forward movement therefor, and although the motion of the entire torpedo is less than the amount necessary for actuation of the inertia switch the momentum transfer frequently is sufficient to cause the switch to close and thereby detonate the torpedo. This movement in response to the momentum transfer occurs because the inertia mass is suddenly given a high velocity in the fore direction and causes the mass to coast forward under its own momentum from then on until contact is made. In the switch of the present invention this action is avoided because the mass is yieldably movable in all directions and no bump or momentum transfer occurs. An examination of the curve shows that the jump or particle displacement due to countermine shocks is about $1/10$ of an inch for 1 millisecond. The inertia switch, however, is so designed as to require that the inertia element move a distance relative to the fixed contact of the switch greater than $1/10$ of an inch in order to make contact and thereby to close the circuit. The inertia switch thus becomes inoperable in response to countermine shocks of magnitudes in the order of those produced by explosive charges of approximately 1000 pounds of TNT at distances of approximately 300 feet regardless of the direction from which the countermine shock is received.

By flexibly suspending the inertia mass such, for instance, as cup 28 at the end of a flexible coil spring, and in the absence of ball 29 within the cup, a few small impulses would build up a resonant oscillation of the mass to the point where the cup would move into engagement with contact 18 to complete the circuit between switch contacts 9 and 20.

In order to absorb the energy of the oscillating mass so that the synchronous oscillations will be critically damped, the lead ball 29 is loosely confined within the hollow cup 28. As the ball bounces around within the cup, energy is absorbed as small dents are made in the ball as it bounces around in the cup out of phase with the vibrations of the system, thus the oscillations are critically damped and the vibrations of the resonant system soon die out.

Figure 14:
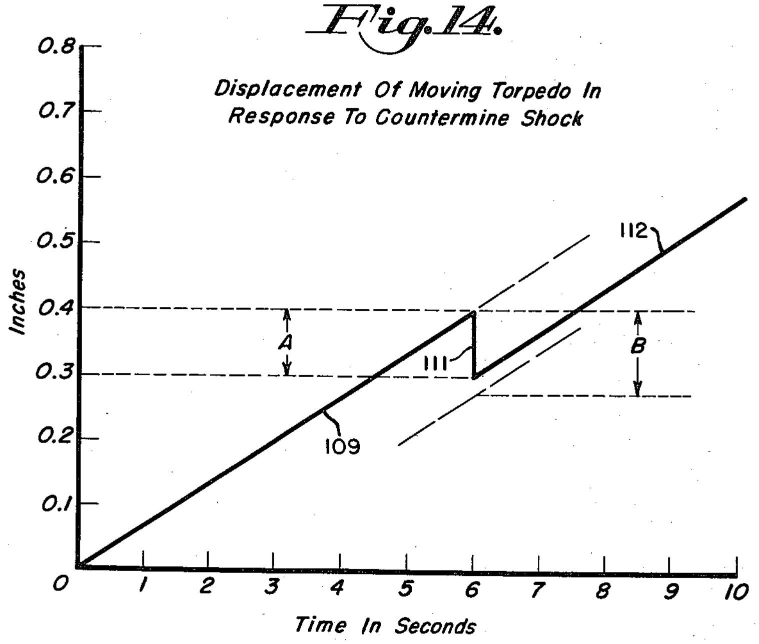
Fig. 14 is a curve illustrating diagrammatically the instantaneous position of a moving torpedo as a function of time and further illustrating the displacement of the torpedo in response to a countermine shock occurring forwardly of the torpedo in the path of travel thereof.

Referring now to Fig. 14 which illustrates the motion of a torpedo, it will be seen that the torpedo at time zero is traveling at a uniform speed indicated by the straight line 109. At approximately 6 seconds later a shock resulting from an explosion of 1000 pounds of TNT at about 300 feet forwardly of the torpedo in the path of travel thereof causes the torpedo to be displaced rearwardly a distance indicated by the reference character A, this distance being in the order of $1/10$ of an inch and corresponding to the relative motion between the coacting contacts of the inertia switch mounted within the torpedo. A displacement indicated by the reference character B and in the order of $1/8$ of an inch is required to close the contacts. After the set back or displacement of the torpedo indicated by the reference character, the torpedo again moves forward at a uniform velocity indicated by the straight line 112.

Figure 15:
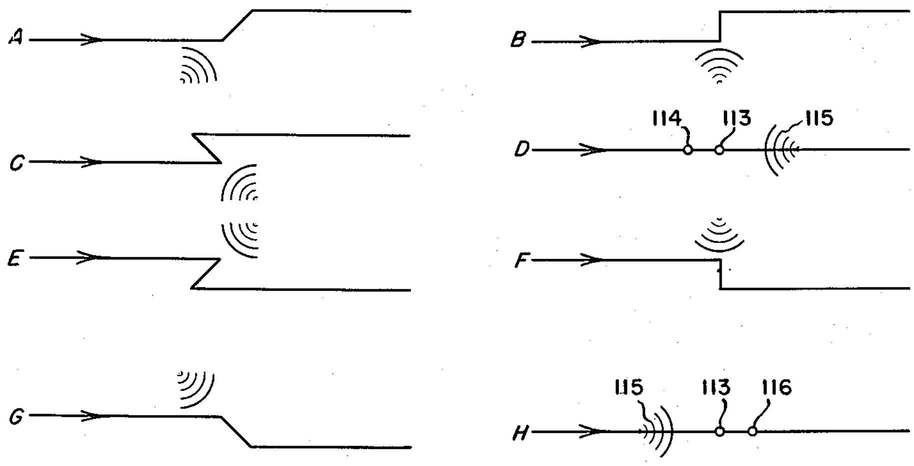
Fig. 15 is a group of curves illustrating the manner of displacement of a moving torpedo in response to countermine shocks received thereby from different directions.

Referring now to Fig. 15, curve *d* therein illustrates the path of travel of the torpedo whose motion is illustrated in Fig. 14, the torpedo being displaced rearwardly from point 113 to point 114 in response to the countermine shock designated 115 and originating forwardly of the torpedo in the path of travel thereof. Similarly, in curve *h* the torpedo is displaced forwardly to the point 116 when shock 115 occurs to the rear of the torpedo in the path of travel thereof. In a similar manner, curves *a*, *b*, *c*, *e*, *f* and *g* illustrate the displacement of the torpedo when the shock occurs laterally, laterally and rearwardly, or laterally and forwardly of the torpedo, as the case may be. In any case, relative movement between the coacting contacts of the inertia switch occurs as a result of the torpedo displacement, but this movement will be insufficient to close the contacts.

Figure 16:
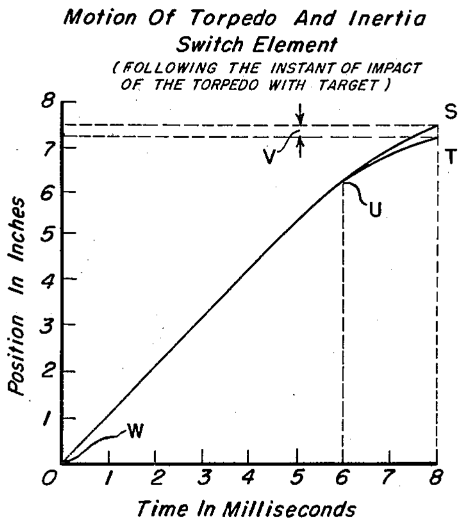
Fig. 16 is a chart illustrating the difference in the decelerations of the torpedo and the inertia responsive element disposed therewithin from the moment of impact of the torpedo with a target vessel.

Referring now to the chart of Fig. 16, the curves *s* and *t* respectively represent the motions of the inertia switch and of the inertia responsive element disposed therewithin from the instant of impact of the torpedo with a target vessel.

It will be noted that during the first 6 milliseconds after impact indicated at *w* on the chart the curves *s* and *t* coincide in a straight line portion which terminates at *u*. Within this period of time the war head at the nose of the torpedo becomes crushed without appreciable deceleration of the torpedo. From 6 to 8 milliseconds after impact the torpedo rapidly decelerates and relative motion between the coacting contacts begins until at approximately 8 milliseconds the deceleration of the torpedo with relation to the deceleration of the inertia element has become sufficient to close the switch contacts, the amount of displacement between the switch housing and the inertia element being indicated at *v* and being in the order of ⅛ of an inch.

Referring now to Figs. 4 to 8 inclusive, there is shown thereon an inertia switch comprising a cup-shaped member 32, formed of nonconducting material, such as "Lucite" or the like, and having a threaded opening 33 in matching engagement with electrical contact 34. Contact 34 has a shoulder 35, with a gasket 40 disposed between the shoulder 35 and the member 32 to form a liquid tight seal therebetween. Machine screw 36, in threaded engagement with contact 34, forms a means for attaching an electrical conductor 37 thereto. An axially disposed recess 38 is provided within the inner face of contact 34 to facilitate contacting of a movable coacting contact therewith, hereinafter more fully to be described. A pair of parallel surfaces 39 are provided on the contact 34 for facilitating the assembly of the contact 34 to the member 32.

Figure 6:
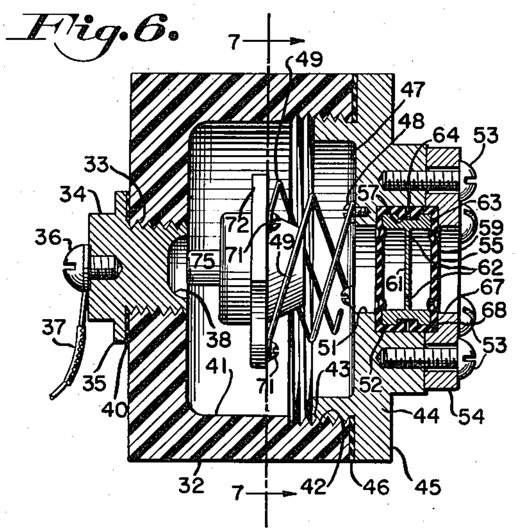
Fig. 6 is a sectional view taken along line 6—6 of Fig. 4.
Figure 4:
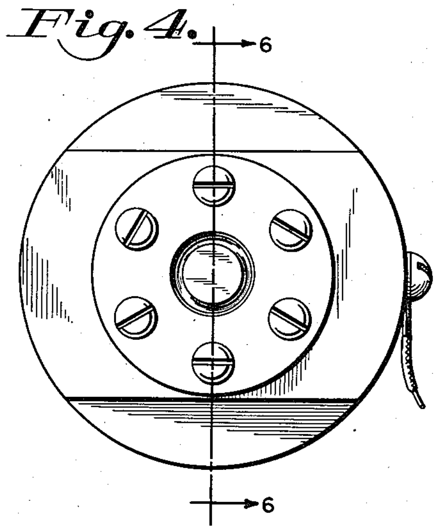
Fig. 4 is an end view of an inertia switch according to an alternative embodiment of the present invention.
Figure 5:
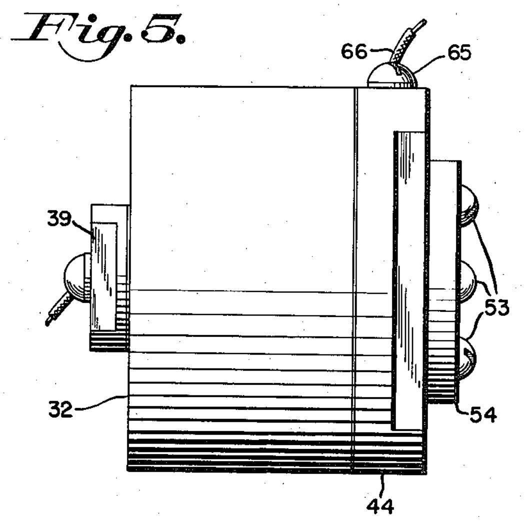
Fig. 5 is a left side view of the switch shown in Fig. 4 rotated 90 degrees counterclockwise.
Figure 8:
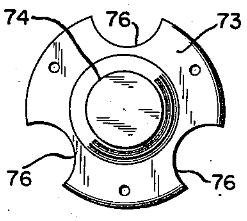
Fig. 8 is an elevational view of the inertia element employed in the switch illustrated in Fig. 6.
Figure 9:
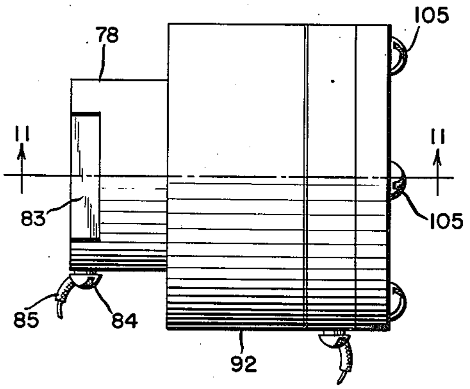
Fig. 9 is a side view of an alternative form of the inertia switch disclosed in Figs. 4 to 8 and comprising the preferred embodiment of the invention.
Figure 10:
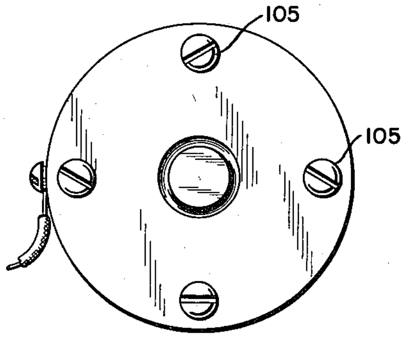
Fig. 10 is an end view of the switch shown in Fig. 9.

Member 32 has an axially disposed recess 41 with an internal thread 42 therein in matching engagement with thread 43 of an electroconducting base 44. Base 44 is provided with a shoulder 45 with gasket 46 interposed between the shoulder 45 and the member 32 to form a liquid tight seal therebetween. Base 44 has an axially disposed recess 47 therein with three machine screws 48 in threaded engagement with base 44 for securing the ends of each of the conically shaped springs 49 thereto. Machine screw 65 in threaded engagement with base 44 provides for attaching electrical conductor 66 thereto. Base 44 has an axial bore 51 therethrough which is enlarged as at 52. Machine screws 53 in threaded engagement with base 44 secures a plate 54 to the base 44. Plate 54 is provided with an axial bore 67 and an enlarged bore 68 to form a matching communicating chamber with enlarged bore 52, this chamber enclosing a diaphragm assembly 59 therein, as shown in Fig. 6.

The assembly 59 is provided with a wall portion 61 with a pair of orifices 62 therethrough and a laterally extending rim 63. Rim 63 has a circumferential groove 64 therein for receiving flanges 57 of diaphragms 55. At the time of assembly the chamber formed within the assembly 59 is entirely filled with any suitable liquid having a flat viscosity-temperature characteristic such as, for example, "Silicon Oil," "Myol," or the like. The assembly is inserted as a unit within the enlarged bores 52 and 68 and is held therein in liquid tight relation between plate 54 and the base 44.

The free end of each of springs 49 is provided with a loop 69 for receiving a machine screw 71, these screws being in threaded engagement with circumferential flange 72 which is formed integrally with inertia element 73. Inertia element 73 has a hub portion 74 with an axially extending cylindrical contact portion 75 which is normally held in spaced relation with respect to recess 38 of contact 34 by springs 49. Flange 72 has a number of peripheral notches 76 cut therein to facilitate the flow of the damping fluid within the switch as the inertia element moves therein.

At the time of assembly, the switch is entirely filled with a damping fluid similar to that used in the diaphragm assembly. With such an arrangement, the diaphragms 55 flex outwardly and inwardly as the liquid within the switch expands and contracts in response to changes in the temperature of the liquid within the switch whereby rupture of the switch due to expansion of the liquid is avoided. Thus, in the present embodiment, inertia element 73, being flexibly suspended on springs 49, is free to move in any direction relative to contact 34, in response to a shock received by the switch. The element 73 and springs 49, however, are prevented from forming a resonant vibrating system by the oil which yieldably resists and damps the movement of the element. When the switch receives a shock from the side or to left of the switch as viewed in Fig. 6 and of sufficient intensity and duration controlled by the spring rate of springs 49, contact 75 moves into recess 38 and into engagement with contact 34 to complete an electrical circuit between electrical conductors 37 and 66. When a shock is received by the switch from the right thereof, inertia element 73 moves toward dashpot 59 but does not move sufficiently to bump the inner side wall of the switch and thus avoids momentum transfer, as set forth in connection with the inertia switch disclosed in Figs. 1 to 3.

Referring now to Figs. 9 through 12, there is shown thereon a vibration damped inertia switch mechanism comprising an electroconducting contact 78, having a hemispherical internal portion 79 therein. Contact 78 carries an externally threaded portion 81 in matching engagement with the threaded portion 86 of a tubular connector 82, the latter being formed of nonconducting material such as "Lucite," "Bakelite" or the like. Contact 78 has a pair of parallel surfaces 83 to facilitate the assembly of the contact 78 to the connector 82. Machine screw 84, in threaded engagement with contact 78 provides means for securing electrical connector 85 thereto. Connector 82 carries an inwardly extending flange 87 at the base of the internally threaded portion 86 which forms an abutment for contact 78 and provides a fluid tight seal therewith. Flange 87 has a centrally disposed opening 88 in registered engagement with the mouth of hemispherical wall 79. Connector 82 is provided with an internally threaded portion 89 in matching engagement with the externally threaded portion 91 of the spring base 92. Spring base 92 has an axial bore 93 which is enlarged as at 94.

Eyelet 99, formed on the outer end of involute spring 98, and spacer 97 are sleeved about shoulder screw 96 which is threadedly secured to face 95 of spring base 92.

The free end of spring 98 has an eyelet 101 sleeved about machine screw 102 which is in threaded engagement with an electroconducting ball 103, thereby to suspend the ball on the end of the spring and within the hemispherical wall portion 79 of contact 78.

A plurality of machine screws 105 extended through suitable bores 106 formed therefor in plate 104 are threadedly engaged with spring base 92 to secure the plate to base 92. Plate 104 is provided with an axially disposed bore 107 and an enlarged bore 108 therethrough, the latter bore forming a matching chamber with bore 94. A diaphragm assembly, similar to assembly 59 shown in Fig. 6, is inserted within enlarged bores 94 and 107 and is secured in fluid tight relation therewithin between plate 104 and spring base 92.

At the time of assembly the chamber within the switch is entirely filled with a fluid having a flat viscosity-temperature characteristic similar to the fluid used in the switch shown in Figs. 4 to 7, inclusive.

Figure 17:
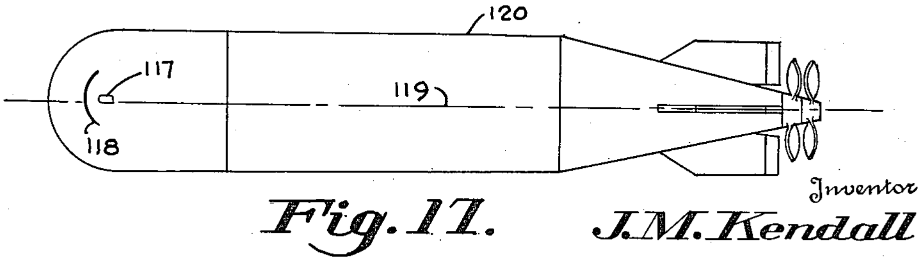
Fig. 17 is a diagrammatic view illustrating the relation between a torpedo and the inertia element and concave contact of an inertia switch.

It is to be understood that any one of the three inertia switches herein disclosed may be used in the firing circuit of a torpedo, such as disclosed in the aforesaid application Serial No. 780,562. The relation between the torpedo and elements of the switch is illustrated diagrammatically in Fig. 17, wherein element 117 is representative of the inertia element of any one of the switches herein disclosed and element 118 represents the concave contact of said switches, the axis of the switch used being coincident with or parallel to the longitudinal axis 119 of a torpedo 120.

Figure 11:
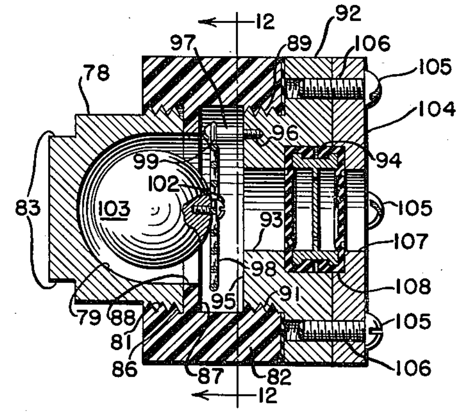
Fig. 11 is a sectional view taken along line 11—11 of Fig. 9.
Figure 12:
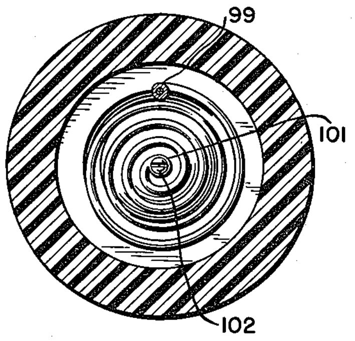
Fig. 12 is a sectional view taken along line 12—12 of Fig. 11.

Whereas from the foregoing it will be apparent that the two forms of oil damped inertia switches disclosed respectively in Figs. 4 to 8 and Figs. 9 to 12 are generally similar in construction and operation, it will be appreciated that different response characteristics are obtainable therefrom by reason of the different shaped springs and different shaped inertia elements employed. For example, the inertia switch best seen in Fig. 11 provides more immediate response and positive engagement of the coacting contacts than the switch best seen in Fig. 6 in response to a shock of the same magnitude and duration. This follows from the fact that the ball shaped inertia element 103 is substantially fully extended within and forms a matching configuration with hemispherical contact 78. Moreover, spring 98 permits a greater freedom of lateral movement of element 103 than springs 49 permit for the element carried thereby, and the ball shape of element 103 presents less resistance to the flow of fluid thereabout as the element moves than does the inertia element of Fig. 8.

It will also be apparent that the three inertia switches disclosed in the foregoing have in common the aforedescribed anti-momentum transfer characteristics and generally have in common provision for damping resonant oscillations of the inertia element employed therein, one of the switches being damped by means of an auxiliary oscillatory member carried by the inertia responsive element and the other switches being damped by fluid surrounding the inertia responsive element.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An inertia switch for a torpedo, said switch comprising, in combination, stationary solid portions including a fixed electrical contact of concave configuration secured within the torpedo, an inertia mass including a coacting contact, and yieldable means supporting said mass for substantially universal movement with said coacting contact normally spaced from said fixed concave contact and in a predetermined geometrical position with respect thereto so that the coacting contact may move a distance in any direction away from said position in response to a countermine shock received by the torpedo without making physical engagement with any solid portion of the switch and may move a greater distance away from said position into electrical engagement with the concave contact in response to an inertia force applied to the mass radially of the concave contact and in the direction thereof as the torpedo strikes a target.

2. An inertia switch for use with a torpedo comprising, in combination, a hemispherical contact member mounted in the torpedo with the mouth portion arranged longitudinally of the torpedo and facing toward the rear thereof, an acceleration responsive housing having a cavity formed therein, yieldable means for normally supporting said housing approximately at the center of said mouth portion of the member for limited movement in any direction away from said center without physical engagement of the housing with any solid portion of the switch in response to countermine shocks received by the torpedo, and a mass movable within said cavity to develop internal damping of the housing as the housing moves in response to vibration of the torpedo in motion, the vibrating mass system comprising said housing and said movable mass therein and said yieldable supporting means therefor being so constructed and arranged as to cause a relatively greater movement of the housing into circuit closing position with respect to said contact member in response to the impact of the torpedo with a target vessel.

3. An inertia switch for a torpedo exploder mechanism comprising, in combination, a housing having a chamber formed therein and secured within the torpedo, means forming an electroconducting concave surface on the wall of said chamber and arranged with the open end of said surface facing the rear of the torpedo, inertia responsive means yieldably supported and geometrically positioned substantially at the center of said concave surface for limited movement within said chamber without physical engagement with the wall thereof in response to countermine shocks received by the torpedo, circuit means including electrical terminals secured respectively to said inertia responsive means and to said electroconducting surface for effecting circuit control functions at said terminals as the inertia responsive means is moved from a first circuit controlling position into a second circuit controlling position with respect to said electroconducting surface in response to the impact of the torpedo with a target vessel, and damping means disposed within said chamber for suppressing the movement of said inertia means in response to resonant vibrations incident to the running of the torpedo.

4. In an inertia responsive switch for an automotive marine device comprising, in combination, enclosing means having an electroconducting wall portion of concave configuration, a movable element disposed substantially at the center of said wall portion, means for normally and yieldably suspending said element in an open circuit position with respect to said wall portion whereby the element is rendered effective to move into a circuit closing position with respect to the wall portion in response to an impact received by the marine device which applies an inertia force to the element radially of the wall portion and in the direction thereof, and means including a quantity of fluid which completely fills the enclosing means for suppressing resonant oscillations of said element in response to periodic vibrations received by the marine device, said element being spaced sufficiently from the inner wall of said enclosing means to prevent physical engagement therewith in response to countermine shocks received by the marine device thereby to prevent momentum transfer to the switch.

5. An inertia switch of the character disclosed comprising, in combination, an electroconducting housing having the configuration of a concave segment, an electroconducting element resiliently mounted approximately at the center of said concave segment for yieldable movement in any direction and adapted to be urged into electrical engagement with said housing in response to inertia forces of predetermined magnitude applied to said element radially of said segment and in the direction thereof, and damping means for preventing said element from moving into said electrical engagement in response to oscillations at the resonant frequency thereof.

6. An inertia responsive circuit closer comprising, in combination, a fluid tight casing having an electroconducting concave wall portion, a mass movable in any direction within said casing, a yieldable member for normally supporting said mass approximately at the center of said wall portion in open circuit position with respect thereto, said mass and yieldable member being so constructed and arranged as to cause the mass to be moved into circuit closing position with respect to said wall portion in response to an inertia force of predetermined magnitude applied to said mass radially of said wall portion and in the direction thereof, and a quantity of damping fluid within said casing for suppressing oscillations of said mass at the resonant frequency thereof.

7. An inertia responsive circuit closer comprising, in combination, a fluid tight casing having an electroconducting hemispherical wall portion at one end thereof, an electroconducting ball adapted to be received within said hemispherical wall portion in spaced relation therewithin, an involute spring for normally supporting said ball yieldably in said spaced relation within the hemispherical wall portion, said ball and spring being so constructed and arranged as to cause movement of the ball into electrical engagement with said wall portion in response to an inertia force applied to the ball radially thereof and in the direction of the wall portion, said casing having a chamber disposed on the opposite side of said spring from the ball whereby momentum transfer to the ball resulting from physical engagement thereof with the opposite end of the casing is prevented when inertia forces of lesser magnitude are applied to the ball radially thereof and in the direction of said opposite end of the casing, said casing having a quantity of damping fluid disposed therewithin, and means including a dashpot arrangement in communication with the fluid in said chamber and the exterior of the casing for causing expansion of the chamber in response to expansion of the damping fluid within the casing.

8. An inertia responsive circuit closer comprising, in combination, an electroconducting member of cylindrical configuration having a recess in one end thereof forming a concave surface therein, a second electroconducting member of cylindrical configuration having a central opening therein, means including a dashpot arrangement disposed within said central opening for sealing the opening in fluid tight relation, a nonconducting member of tubular configuration for securing said first and second members in spaced relation to form a fluid tight chamber therewithin, an electroconducting element of cylindrical configuration disposed within said chamber and having a contact portion receivable into said recess and into electrical engagement with said concave surface therewithin, a plurality of involute springs arranged in circumferentially spaced relation for normally and yieldably supporting said element intermediate said first and second members and substantially axially thereof, said supporting springs and element comprising a vibrating mass system effective to cause movement of the element into said electrical engagement with said concave surface in response to an inertia force applied to the element in the direction of the concave surface, said chamber having a quantity of damping fluid therein which completely fills the chamber whereby said dashpot operates to expand the chamber in response to expansion of the fluid and the fluid suppresses resonant vibrations of the element, said element having a flange thereon for further suppressing resonant vibrations of the element within the fluid, and circuit controlling means including said element, springs, first and second members, and terminals secured respectively to the first and second members.

9. An inertia switch comprising, in combination, first and second electroconducting members substantially of cylindrical configuration, one of said members having a recess in one end thereof forming a concave surface therein, a nonconducting member having a central opening and means for securing said first and second members thereto in spaced relation with respect to each other and in substantial axial alignment with the central opening, an inertia responsive element, electroconducting yieldable means secured to said element and to the other one of said members for normally supporting said element within said central opening and intermediate said first and second members, said element and said supporting means comprising a vibrating mass system so constructed and arranged as to cause movement of the element into electrical engagement with said concave surface in response to an inertia force of predetermined magnitude applied to the element radially of the surface and in the direction thereof, and circuit means including terminals secured respectively to said first and second members for effecting circuit controlling functions at the terminals as the element moves into and out of electrical engagement with said surface.

10. An inertia switch comprising, in combination, a hollow casing of cylindrical configuration and composed of nonconducting material, a hemispherical contact segment, terminal means extended through the casing for securing said segment within the casing with the rounded end of the segment in abutting engagement with one end of the casing, a hollow electroconducting inertia responsive element, a second terminal means extended through the casing, an involute spring secured to said second terminal means and to said element for yieldably supporting the element normally at the approximate center of the mouth of the hemispherical segment, and a deformable mass disposed within the element for free movement therewithin thereby to damp resonant oscillations of the element, said spring, element, and mass therein comprising a vibrating mass system so constructed and arranged as to render the element effective to move into electrical engagement with said segment in response to an inertia force of predetermined magnitude applied to the element radially of the segment and in the direction thereof, said element being disposed intermediate the spring and said segment and substantially centrally of the casing whereby physical engagement of the element with the casing is prevented in response to inertia forces of less than said predetermined magnitude applied to the element whereby momentum transfer to the element is prevented.

11. An inertia switch for a torpedo exploder mechanism comprising a hollow housing, an electrical contact comprising an electroresponsive surface secured to said housing and exposed to the hollow interior thereof, an electroconducting inertia responsive element mounted within said hollow housing for electrical coaction with said electroresponsive surface, spring means mounting said inertia element on said housing and normally maintaining said inertia element in spaced relation to said electroresponsive surface, and means for damping the oscillations of said inertia element due to countermine shock whereby upon impact of the torpedo with a target said inertia element moves into contact with said electroresponsive surface overcoming the resistance of said spring means and said damping means.

12. An inertia switch for a torpedo exploder mechanism comprising a housing having a chamber formed therein, a concave electroresponsive surface secured to said housing and exposed to the chamber formed therein, an electroconducting inertia responsive element mounted within said housing for electrical coaction with said electroresponsive surface, resilient means mounting said inertia element in approximate equidistant spaced relation to all points on said concave electroresponsive surface, and means for damping the movement of said inertia means in response to resonant vibrations incident to the running of the torpedo whereby upon impact of the torpedo with a target said inertia responsive element moves in any direction within an arc of 180° to contact a point on said concave electroresponsive surface.

References Cited in the file of this patent

UNITED STATES PATENTS

| | | |
|---|---|---|
| 665,998 | Davis | Jan. 15, 1901 |
| 1,175,062 | Johnson | Mar. 14, 1916 |
| 2,013,924 | Nolte | Sept. 10, 1935 |
| 2,263,471 | Persons | Nov. 18, 1941 |